United States Patent Office 3,006,972
Patented Oct. 31, 1961

3,006,972
COUPLING OF AROMATIC RINGS
Ellis K. Fields, Chicago, Ill., and Carl Serres, Jr., Hammond, Ind., assignors to Standard Oil Company, Chicago, Ill., a corporation of Indiana
No Drawing. Filed Aug. 21, 1959, Ser. No. 835,195
12 Claims. (Cl. 260—649)

This invention relates to the preparation of a certain class of diarylmethanes and more specifically pertains to the coupling of aromatic hydrocarbons by a methylene group contributed by a benzyl type halide, said coupling reaction being carried out in the presence of an aluminum heavy metal couple.

The condensation of a benzyl halide such as benzyl chloride with an aromatic compound in the presence of a wide variety of catalysts under various reaction conditions has been extensively studied. The catalysts most often used are halides of aluminum, iron, titanium, beryllium, zinc and tin; the metals themselves, such as aluminum; or strong mineral acids, such as hydrogen fluoride. In general, these reactions produce as the principal product a benzylated aromatic compound; i.e., each reactant contributes a portion to the final product as illustrated in the following reaction equation:

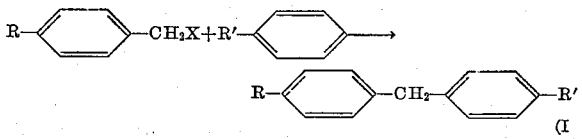

wherein R may be hydrogen, an alkyl group or a halogen; X is a halogen; and R' may be a hydrogen, an alkyl group, a halogen, a chloromethyl group, among others. Included among the by-products of such a reaction are the diarylmethanes wherein each of the aryl groups is contributed by the aromatic reactant such as:

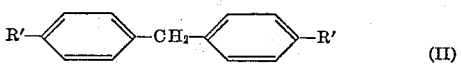

However, such diarylmethanes (II) are formed in insignificant amounts according to the above-noted processes. Also, in such processes there are formed as a substantial by-product dibenzyl benzenes of the formula:

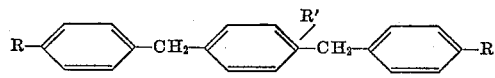

as well as higher molecular weight polybenzyl benzenes.

It will be appreciated that the benzylated aromatics of Formula I and the diarylmethanes of Formula II are, generically speaking, "diarylmethanes." However, to distinguish between these two classes of compounds the first will be referred to herein as the "expected benzyl aromatics (I)" and the second as "unexpected diarylmethanes (II)." The Roman numeral in each case will refer to the formulae hereinbefore set forth.

The principal large scale method for preparation of diarylmethanes involves condensation of two aromatic molecules with formaldehyde, using catalysts such as aluminum chloride, sulfuric acid or p-toluene sulfonic acid. Our own work with the best of these catalysts, p-toluene sulfonic acid, showed yields of diarylmethanes of 30–40% or usually about half the yields obtained by the method of this invention. Further, it is difficult or impossible in many cases to condense less reactive aromatics such as benzene or chlorobenzene by the formaldehyde method, while they are readily condensed to produce diarylmethanes by the method of this invention.

The prior uses of aluminum chloride as a catalyst for the reaction of benzyl type reactants and aromatics have produced varied results depending upon the amount of catalyst and the ratio of reactants employed. When small amounts of aluminum chloride, in the neighborhood of about 0.1 mole percent based on the benzyl halide, are employed, the catalyst is destroyed by the presence of minute amounts of moisture or by forming inactive complexes with the aromatic reactant. Thus, aluminum chloride was not available for any appreciable length of time as a catalyst. The use of gross amounts of aluminum chloride; i.e., in excess of 10 mole percent based on the benzyl halide reactant, resulted in the formation of tars, high molecular weight polybenzyl benzenes and many other by-products and did not, therefore, form the basis of a suitable process for preparing either the expected benzyl aromatics (I) or the unexpected diarylmethanes (II). By employing a large excess of aromatic reactant, 5 or more moles of aromatic per mole of benzyl halide type reactant, and employing moderate amounts of aluminum chloride, say 1 to 5 mole percent based on the benzyl halide type reactant, there were formed as the principal product the unexpected diarylmethanes (II). However, even in such a process the aluminum chloride catalyst is not recoverable for reuse from the resulting reaction mixture since it is generally complexed with some of the excess aromatic reactant and is separated from the reaction mixture by destroying the complex, with the aluminum being generally in the form of its hydroxide. Thus, the latter described process, which employs moderate amounts of aluminum chloride, has not provided an acceptable process for the large scale production of the unexpected diarylmethanes (II).

We have now discovered a method for the preparation of the unexpected diarylmethanes (II) which is useful for large scale preparation of these compounds; these compounds are useful as the starting materials for the preparation of benzophenones and benzophenone carboxylic acids. The process of our discovery involves reacting a benzyl halide type reactant with an excess of aromatic reactant; i.e., more than 2 moles of aromatic reactant per mole equivalent of halomethyl group. Desirably the ratio of reactants is 5 or more moles and preferably 10 to 15 moles of aromatic reactant per mole of halomethyl group in the benzyl halide type reactant. The reaction is carried out in the presence of an aluminum-heavy metal couple as the catalyst at a temperature of above 0° C., desirably at a temperature in the range of 0 to 100° C. and preferably in the range of 20 to 100° C. The process of this invention proceeds in the presence of the aluminum-heavy metal couple according to the following reaction:

(2)

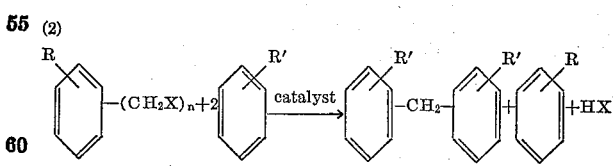

wherein R and R' are hydrogen, one or more alkyl groups, halogen, nitro groups and other nuclear substituted groups, and $n$ is an integer from 1 to 3 inclusive. As hereinbefore indicated, the benzyl halide type reactant is employed only to provide the coupling divalent methylene group and, as reaction Equation 2 indicates, does not contribute an aryl group to the unexpected diarylmethanes (II). For reasons which will hereinafter be explained, we do not claim as part of our invention the preparation of diphenylmethane when prepared by reacting benzene with an alpha-halotoluene in the presence of aluminum amalgam. Thus, for the purposes of defining our invention, R and R' are not hydrogen at the same time when n is 1 in reaction equation 2. However, our invention does contemplate the use of benzene when n is 2 or 3 or when R is a nuclear substituent or substituents as hereinbefore defined. It will be appreciated that the process of this invention for most commercial operations will be preferably carried out employing as the benzyl halide reactant an alpha-halotoluene, for in this case the benzyl halide reactant produces as the reaction by-product benzene which can readily be separated from the reaction mixture and which can be readily chloromethylated to provide additional benzyl halide reactant. Illustrative of the aromatic reactants are benzene, mono-, di- and tri-alkylated benzene wherein the alkyl groups contain from 1 to 20 carbon atoms, preferably 1 to 4 carbon atoms, and their nuclear halogenated derivatives, as well as their alkyl halogenated derivatives; nitro derivatives of benzene and said alkyl benzenes; biphenyl, nitro biphenyls, chloro biphenyls, alkyl ($C_1$ to $C_{20}$, preferably $C_1$ to $C_4$) biphenyls, the corresponding halo alkyl biphenyls; naphthalene, alkyl naphthalenes, nitro naphthalenes, halo alkylnaphthalenes, halo naphthalenes and the like.

The catalyst, an aluminum-heavy metal couple, is employed in an amount of at least about 0.1% by weight, desirably in the range of 0.1 to 10% by weight and preferably 1 to 5% by weight based on the benzyl halide type reactant. The heavy metal component of the catalyst should, of course, be below aluminum in the electromotive series and preferably be below hydrogen. Suitable heavy metals are copper, mercury (ous), silver, palladium, mercury (ic), platinum, gold, iridium and the like.

With respect to the excepting from the inventive discovery to which our process pertains of the reaction of benzene and alpha-halotoluenes in the presence of aluminum amalgam, it is acknowledged that such a reaction is described as producing diphenylmethane in "Organic Synthesis," Collective Volume II, John Wiley & Sons (1943) reported at Page 232. It will be appreciated by those skilled in the art that diphenylmethane would result regardless of the type of reaction involved; i.e., whether the reaction consists in the benzylation of benzene or in the coupling of 2 moles of benzene by the methylene group contributed by benzyl chloride.

Previous to our discovery it was considered that the reaction of a benzyl halide type reactant with an aromatic hydrocarbon in the presence of aluminum amalgam produced a diarylmethane by the benzylation of the aromatic hydrocarbon; i.e., the reaction produced the expected benzyl aromatics (I). In support of this concept, reference is made to J. Am. Chem. Soc., 73, 1149 (1951). In this article by R. Adams and K. R. Eilar there is described the reaction of alpha-chloro meta-xylene with meta-xylene in the presence of aluminum amalgam. It is reported that this reaction produces 2,3',4-trimethyl diphenylmethane. A derivative of this compound, when compared to the same derivative of the trimethyl diphenylmethane produced by an altogether different route, establishes that the production of the aluminum amalgam catalyzed process did produce the above-named trimethyl diphenylmethane, which is, of course, the expected benzyl aromatics (I).

However, when the process of this invention is carried out with aromatic reactants having 2 or more nuclear substituents and wherein 2 of the nuclear substituents are not so oriented as to be attached ring carbon atoms in the meta position; i.e., when the reactants contain ortho and para-oriented nuclear substituents, the resulting products are principally the unexpected diarylmethanes (II).

The process of this invention and the unexpected results produced thereby will be hereinafter illustrated by the description of specific embodiments thereof.

The process to which this invention is directed, therefore, is the coupling of aromatic nuclei by a methylene group provided by a benzyl halide type reactant. This process comprises reacting an aromatic compound having at least one hydrogen on a ring carbon atom and a benzyl halide type reactant in the presence of an aluminum-heavy metal couple at a temperature above 0° C. The aromatic compound can be benzene or nuclear substituted benzenes,

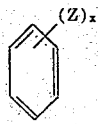

wherein Z is a nuclear substituent such as an alkyl group, hydrogen, a halogen or a nitro group and x is a number of from 0 to 5. When x is 0, the aromatic reactant is, of course, benzene. When x is 2 or higher, the nuclear substituents Z are not in a meta-oriented configuration. In addition, aromatic reactants containing two or more fused benzene rings such as in naphthalene, anthracene, and the like or two or more benzene rings joined as in biphenyl, terphenyl, and the like as well as the alkylated, halogenated and nitro derivatives of these aromatic compounds are included in the process of this invention. More specifically, as aromatic hydrocarbons there can be employed benzene, toluene, cumene, tertiary butylbenzene, decylbenzene, dodecylbenzene, alpha- and beta-methyl-naphthalene, biphenyl, terphenyl, o- and p-xylene, o- and p-diethyl-benzene, o- and p-cymene, o- and p-ethyltoluene, o- and p-diisopropyl-benzene, o- and p-tertiary-butyltoluene, o- and p-tertiary-butylcumene, o- and p-di-tertiary-butylbenzene, 1,2,3-trialkylbenzenes such as hemi-mellitine, 1,2,3-tri-ethylbenzene, and the like, 1,2,3,4-tetra-alkylbenzene such as prehnitene, pentamethylbenzene and the like. Also included are the halogenated derivatives, such as chlorobenzene, o- and p-chlorotoluene, alpha and beta chloronaphthalene, 2-chloro-meta-xylene, 2-chloro-meta-cymene, 1-chloro-2-methyl naphthalene, chlorinated biphenyl, chlorinated terphenyls and the corresponding bromo, iodo and fluoro compounds; the nitro derivatives, such as nitrobenzene, o- and p-di-nitrobenzene, o- and p-nitrotoluene, 2-nitro-meta-xylene, 2-nitro-m-diisopropylbenzene, 2-nitro-meta-cymene, alpha and beta-nitronaphthalene, nitrobiphenyl and the like.

As the methylene group contributing benzyl halide compound there can be employed compounds of the formula:

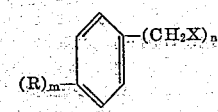

where n is a number from 1 to 3 inclusive, R is halogen, nitro or an alkyl group, m is a number of from 0 to 5 and the sum of m+n is not greater than 6. When the aromatic reactant is benzene, m is at least one.

The process of this invention is more specifically described by the following illustrative examples. The aluminum amalgam catalyst employed in the following examples is prepared by washing finely-divided aluminum, 8–20 mesh, with ether. The washed aluminum is treated for about 2 to 3 minutes with a saturated aqueous solution of mercuric chloride. The amalgam thus formed is then rapidly washed in succession with distilled water, methanol, and the hydrocarbon to be used in the reaction. All this is accomplished with a minimum exposure to the atmosphere.

Example I

Para-xylene (318 g., 3.0 moles) and freshly prepared aluminum amalgam (1.3 g.) are placed in a 1 l. flask, and benzyl chloride (59.0 g., 0.46 mole) is slowly added at room temperature so that evolution of hydrogen chloride is controlled. The addition is carried out over a period of two hours; the mixture at the end of this time becomes slightly warmer and dark brown-black in color. The reaction mixture, after decantation from the catalyst and a small amount of tarry sludge which has formed, is washed with dilute sodium hydroxide solution and water, dried over calcium chloride, and then fractionally distilled. The principal fraction has a B.P. 100–105° C./0.5 mm. and solidifies in the receiver. Crystallization of this material from acetic acid furnishes long, white needles of product, M.P. 61–62° C. The product is shown to be di-p-xylylmethane by comparison of M.P. and mixed M.P. with an authentic sample of di-p-xylylmethane. The molecular weight is found to be 227±7 (theory 224). The weight of crude product is 50 g. (0.22 mole); yield 48% (based on benzyl chloride).

Example II

Benzene (780 g., 10 moles), dried by azeotropic distillation, and freshly prepared aluminum amalgam (4 g.) are placed in a flask equipped with a reflux condenser and dropping funnel, and α,p-dichlorotoluene (160 g., 1.0 mole) is slowly added at a rate such that the benzene gently refluxes, and the hydrogen chloride evolution is controlled. The addition requires 1½ hours. The reaction mixture is dark brown-black at the end of this time. The reaction mixture, after decantation from the catalyst and tarry residue which forms in small amount, is washed with dilute sodium hydroxide solution, water, dried over calcium chloride, and then fractionally distilled. The first fraction obtained has a B.P. 130–131° C., and is a colorless liquid, $n_D^{20}$ 1.5235. This material is shown to be chlorobenzene. It weighs 75 g. (0.67 mole). A second fraction is obtained by fractionation under reduced pressure and has a B.P. 70–72° C./15 mm. This product is shown to be diphenylmethane by boiling point, melting point, and comparison of infra-red spectrum with the spectrum of authentic diphenylmethane. This product weighs 118 g. (0.70 mole), yield 70%. A third fraction has a B.P. 158–160° C./0.5 mm., weight 12 g. and is benzyl diphenylmethane isomers (0.05 mole).

Example III

Benzene (420 g., 5.4 moles), dried by azeotropic distillation, and freshly prepared aluminum amalgam (2 g.) are placed in a flask equipped with a reflux condenser, and α,α'-dichloro-p-xylene (57 g., 0.33 mole) is slowly added at a rate such that the benzene gently refluxes and the hydrogen chloride evolution is controlled. The addition requires two hours and the reaction mixture is black at the end of this time. The reaction mixture, after decantation from the catalyst and tarry sludge which forms in small amount, is washed with dilute sodium hydroxide solution, water, dried over calcium chloride, and then fractionally distilled. The principal product has a B.P. 72–73° C./0.15 mm., M.P. 25° C., and $n_D^{20}$ 1.5770. These data and the infra-red spectrum show this product is diphenylmethane. It weighs 70 g. (0.42 mole), yield 64% based on theory for reaction of both chloromethyl groups. A second fraction is also obtained which has a B.P. 158–160° C./0.15 mm., weighs 10 g., and appears to be benzyl diphenylmethane isomers (0.04 mole).

Example IV

Dry para-xylene (290 g., 2.7 moles) and freshly prepared aluminum amalgam (1.0 g.) are placed in a 1 l. flask fitted with a condenser and heated to full temperature of the steam bath. Slow addition of α,α'-dichloro-p-xylene (28.5 g., 0.16 mole) is carried out over a period of three hours. The reaction mixture is worked up as described in Example III and the crude product fractionally distilled. The product distills at B.P. 107–110°/0.25 mm. and, on cooling, solidifies to white needles of M.P. 60–61° C. The melting point is not depressed on admixture with authentic di-p-xylylmethane. This product is thus di-p-xylylmethane, weight 43 g. (0.2 mole), yield 63% based on theory for reaction of both chloromethyl groups. An uncharacterized high boiling residue (175° C./0.25 mm.) weighing 10 g. is also obtained.

Example V

Chlorobenzene (600 g., 5.4 moles), dried by azeotropic distillation, and freshly prepared aluminum amalgam (3 g.) are placed in a 1 l. flask and α,α'-dichloro-p-xylene (57.0 g., 0.33 mole) is slowly added over a period of two hours at steam bath temperature. The reaction mixture is then worked up as described in Example III. Fractional distillation of the crude product gives first a mixture of dichloro-diphenylmethane isomers, B.P. 110–120° C./0.15 mm., $n_D^{20}$ 1.5915, weight 60 g. (0.25 mole), 40%. A high boiling material (175° C./0.15 mm.) weighing 20 g. is also obtained and appears to have resulted from the condensation of three chlorobenzene molecules.

Example VI

To a mixture of 420 g. (5.4 moles) dry benzene and 2 g. aluminum amalgam are added 80 g. (0.5 mole) α, o-dichlorotoluene at 50° C. over a period of 1.5 hours. When addition is complete, the mixture is refluxed for 30 minutes; at this point HCl is no longed evolved. The reaction mixture is dark brown-black at the end of the reaction; a thin layer of black syrup is formed on the flask wall, but the aluminum amalgam appears to be unchanged. Fractional distillation of the organic layer gives 34 g. (0.30 mole) chlorobenzene, B.P. 130–131° C., $n_D^{20}$ 1.5237; 50.5 g. (0.30 mole, 60%) diphenylmethane, B.P. 73–75° C./0.20 mm., $n_D^{20}$ 1.5770; 12 g. (0.06 mole) chlorodiphenylmethane isomers, B.P. 80–90° C./0.20 mm., $n_D^{20}$ 1.5875; and 10 g. high boiling residue, mainly dibenzylbenzenes. These products are identified by infra-red analysis, gas chromatography, and physical constants.

Example VII

The process described in the foregoing examples is repeated employing 5.4 moles of benzene, 0.33 mole of p-methylbenzyl chloride and 1.0 g. of aluminum amalgam. From the resulting reaction mixture there are recovered, in addition to the benzene, 0.25 mole of toluene, 0.25 mole of diphenylmethane (76 mole percent based on the methylene group available from the p-methylbenzyl chloride) and about 10 g. of dibenzylbenzenes.

Example VIII

The process described in the foregoing examples is repeated employing 10.0 moles benzene, 1.0 mole p-chlorobenzyl chloride and 4.0 grams of freshly prepared aluminum amalgam at 50–60° C. for 1.5 hours. From the resulting reaction mixture there are recovered, in addition to the benzene, 0.67 mole chlorobenzene, 12 grams of dibenzylbenzenes and 0.70 mole diphenylmethane (70 mole percent yield based on the methylene group available from p-chlorobenzyl chloride).

Example IX

Di-p-xylylmethane may be also prepared by reacting 530 grams (5 moles) of anhydrous p-xylene with 60.75 grams (0.5 mole) anhydrous benzyl chloride in the presence of 2.4 grams of freshly prepared aluminum amalgam at 80° C. for about 6 hours using the procedure of the foregoing examples. A yield of di-p-xylylmethane comparable to that produced in Example IV may be obtained by distilling the reaction mixture remaining after removal of the catalyst. Benzene is produced as a by-product as will be an uncharacterized high boiling residue similar to that produced in Example IV.

It will be noted that in the processes of Examples I through IX there was little or none of the expected benzyl aromatics (I) formed.

In contrast to the foregoing, the reaction of chlorobenzene and $\alpha,\alpha'$-dichloro-p-xylene in the presence of aluminum chloride produced mainly a mixture of mono- and di-chloro-diphenylmethanes, but no benzene was found as in the case of the formation of the unexpected diarylmethanes (II).

By repeating the process of Example IV, except using o-xylene in place of p-xylene, a mixture of bis (dimethylphenyl) methanes, yield at least 60% of theory based on the utilization of both methylene groups of $\alpha,\alpha'$-dichloro-p-xylene, may be obtained. Likewise, a mixture of ortho- and para-ditolylmethanes may be prepared by reacting toluene with benzyl chloride, benzyl bromide, p-chlorobenzyl chloride, p-bromobenzyl bromide, $\alpha,\alpha'$-dichloro-p-xylene, $\alpha,\alpha',\alpha''$-trichloro pseudocumene, and the like in the presence of aluminum amalgam, preferably at a temperature of 50° C. or above. The corresponding iodides and fluorides, although more expensive than the chlorides and bromides, may also be used to provide the linking methylene groups.

The processes of Examples I through IX are repeated, except that an aluminum-copper couple is substituted for aluminum amalgam. The yields of the unexpected diphenylmethanes described in Examples I through VII obtainable will be above 60 mole percent. The aluminum-copper couple is prepared by crimping together three-inch lengths of clean number 20 copper and aluminum wires.

The aluminum couple catalyst used in the process of this invention forms a black syrup complex with the aromatic reactants. However, after the reaction is complete, the aluminum-metal couple can be readily recovered substantially unchanged with no apparent loss. Much unlike the use of aluminum chloride which is usually destroyed when removing it from the reaction mixture, the aluminum-metal couple can be readily recovered and reused as, for example, by recycling with fresh reactants.

While the reaction of meta-xylene with meta-methylbenzyl chloride in the presence of aluminum amalgam is reported by R. Adams and K. R. Eilar, J. Am. Chem Soc. 73, 1149 (1951) to produce 2,3',4-trimethyl diphenylmethane (the expected benzyl aromatics I), the process of this invention produces the unexpected diarylmethanes (II) when ortho- or para-oriented disubstituted benzenes are the coupled reactants. It appears, therefore, that the process of this invention is unique.

An additional advantage of the process of this invention lies in the fact that the benzyl halide type reactant after contributing its methylene group or groups to the reaction is readily recoverable and is a useful by-product. For example, when benzyl chloride, bromide, iodide or fluoride is the methylene group contributing benzyl halide reactant, the by-produce is, of course, benzene. Thus, toluene can be readily chlorinated to benzyl chloride, benzyl chloride used to prepare di-p-xylylmethane, or ditolylmethanes, etc. according to the process of this invention and a rather pure benzene recovered as a by-product. Benzene would also be recovered when $\alpha,\alpha'$-dichloroxylenes are employed as the methylene group contributing benzyl halide type reactants. Monochlorobenzene would be recovered when p-chlorobenzyl chloride is employed as the methylene group providing benzyl halide reactant. This in turn could be reacted with benzyl chloride or p-chlorobenzyl chloride to produce di(monochlorophenyl) methanes.

The versatility or flexibility of the process of this invention and its advantages as herein described and illustrated will suggest further application of this process to those skilled in the art.

What is claimed is:

1. A process for the preparation of a diarylmethane by reacting an aromatic compound with a benzyl halide wherein the aryl groups of the diarylmethane are the same and are derived from the aromatic reactant by the removal of one hydrogen therefrom which comprises: reacting under anhydrous conditions at a temperature above 0° C. in the presence of a catalyst comprising an aluminum-heavy metal couple wherein the heavy metal component is a metal below hydrogen in the electromotive series, more than two moles of an aromatic compound having at least one hydrogen attached to an aromatic ring carbon and is selected from the aromatic compound class consisting of aromatic hydrocarbons and nuclear substituted derivatives thereof free from meta-oriented nuclear substituents, for each mole of a benzyl halide containing one to three halomethyl groups, and recovering a diarylmethane whose aryl groups are the same and are derived from the aromatic compound reactant wherein said process the aromatic compound is chosen with respect to said benzyl halide so that, when the benzyl halide contains only one halomethyl group and the benzene ring is otherwise free from nuclear substituents, said aromatic compound contains at least one nuclear substituent, and when the benzyl halide contains at least one nuclear substituent on the benzene ring in addition to the halomethyl group, said aromatic compound is any member of said defined class thereof.

2. The process of claim 1 wherein the catalyst is aluminum amalgam.

3. The process of claim 1 wherein the catalyst is aluminum-copper couple.

4. The process of claim 1 wherein the temperature is at least about 50° C.

5. A process for the preparation of diphenylmethane which comprises reacting anhydrous benzene and an anhydrous benzyl halide containing more than one nuclear substituent at least one of which is a halomethyl group in the ratio of at least two moles of benzene for each mole equivalent of halomethyl group at a temperature of at least about 50° C. in the presence of 2 to 4 percent of aluminum amalgam by weight based on said benzyl halide reactant, and recovering diphenylmethane.

6. The process of claim 5 wherein the benzyl halide is a nuclear chlorobenzyl chloride.

7. A process for the preparation of a di (mononuclear substituted phenyl) methane which comprises reacting more than two moles of an anhydrous mononuclear substituted benzene with each mole of benzyl chloride at a temperature of at least 50° C. in the presence of from 2 to 4% aluminum amalgam, and recovering the di (mononuclear substituted phenyl) methane.

8. The process of claim 7 wherein a ditolylmethane is prepared from toluene and benzyl chloride.

9. The process for the preparation of a bis (dinuclear substituted phenyl) methane product by the reaction of a dinuclear substituted benzene with a benzyl chloride whereby the dinuclear substituted phenyl groups are derived from said dinuclear substituted benzene by the removal of one hydrogen therefrom, which comprises: reacting more than two moles of anhydrous dinuclear substituted aromatic benzene with each mole of benzyl chloride at a temperature of at least 50° C. in the presence of 2 to 4% aluminum amalgam by weight based on the benzyl chloride, and recovering the bis (dinuclear substituted phenyl) methane product.

10. The process for the preparation of di-p-xylylmethane which comprises reacting more than two moles of anhydrous p-xylene with each mole of anhydrous benzyl chloride at a temperature of at least 50° C. in the presence of 2 to 4% aluminum amalgam by weight based on benzyl chloride, and recovering di-p-xylylmethane.

11. The process for the preparation of di-p-xylylmethane which comprises reacting more than two moles of anhydrous p-xylene with each mole of anhydrous α,α'-dichloro-p-xylene at a temperature of at least 50° C. in the presence of 2 to 4% aluminum amalgam by weight based on benzyl chloride, and recovering di-p-xylylmethane.

12. The process for the preparation of a di (chlorophenyl) methane product which comprises reacting more than two moles of anhydrous chlorobenzene with each mole α,α'-dichloro-p-xylene at a temperature of at least 50° C. in the presence of 2 to 4% aluminum amalgam by weight based on α,α'-dichloro-p-xylene, and recovering a di (chlorophenyl) methane product.

References Cited in the file of this patent

Org. Syntheses, Coll. Vol. II (1943), p. 232.
Adams et al.: J. Am. Chem. Soc., 73, 1149–53 (1951).